United States Patent [19]

Takahashi

[11] Patent Number: 5,008,823
[45] Date of Patent: Apr. 16, 1991

[54] METHOD AND APPARATUS FOR DETERMINING FAILURE OF VEHICLE STEERING SENSING DEVICE

[75] Inventor: Akira Takahashi, Tokyo, Japan

[73] Assignee: Fuji Jukogyo Kabushiki Kaisha, Tokyo, Japan

[21] Appl. No.: 491,204

[22] Filed: Mar. 9, 1990

[30] Foreign Application Priority Data

Mar. 14, 1989 [JP] Japan .................. 1-61442

[51] Int. Cl.⁵ .............. G01M 19/00; B62D 1/00
[52] U.S. Cl. .............. 364/424.03; 73/118.1; 180/141
[58] Field of Search .......... 180/79.1, 140-143; 364/424.05, 424.03; 73/118.1

[56] References Cited

U.S. PATENT DOCUMENTS 4,700,563 10/1987 Iwata et al. ............ 73/118.1

FOREIGN PATENT DOCUMENTS 0359673 3/1990 European Pat. Off. ........ 180/79.1
61-73475 5/1986 Japan .
2217005 10/1989 United Kingdom ........ 180/79.1

Primary Examiner—Charles A. Marmor
Assistant Examiner—Paul Dickson
Attorney, Agent, or Firm—Beveridge, DeGrandi & Weilacher

[57] ABSTRACT

For determining a failure of a steering sensing device of a motor vehicle with a four-wheel steering system wherein rear wheels are also steered responsive to the operation of a steering wheel, there is provided a steering angle sensor for detecting steering angle of the steering shaft and a steering speed sensor for detecting steering speed of the steering shaft. For determining a failure, a calculated value of variation with time of the detected steering angle is compared with the value of the detected steering speed. When the difference between the two values or the ratio of one value to the other value is outside of a predetermined range, it is determined that there is a failure in at least one of the sensors.

5 Claims, 4 Drawing Sheets

METHOD AND APPARATUS FOR DETERMINING FAILURE OF VEHICLE STEERING SENSING DEVICE

BACKGROUND OF THE INVENTION

The present invention relates to a method and apparatus for determining a failure of a steering sensing device of a motor vehicle, and, more particularly, to a determination of failure of a steering speed sensor and/or a steering angle sensor provided in a steering mechanism of a motor vehicle with a four-wheel steering system.

An apparatus for determining a failure in a steering sensing device of a motor vehicle is known as disclosed in Japanese Utility Model Laid-Open Publication No. 61-73,475 published May 19, 1986. The apparatus disclosed in this publication is for a four-wheel steering system wherein rear wheels are steered in relation to the steering of front wheels. The apparatus comprises a first steering angle sensor for detecting a turning angle of the steering shaft, a second steering angle sensor for detecting the same turning angle, and means for comparing the angles thus detected by the two sensors to determine whether there is a failure in at least one of the sensors.

In the known apparatus described above, it is necessary to adjust a neutral point for each sensor so as to precisely coincide with the neutral position of the steering shaft. This adjustment takes a considerable time. Furthermore, the time consuming adjusting operation must be carried out for the two sensors.

Apart from the above, in the four-wheel steering system wherein the rear wheel steering speed is controlled responsive to the steering speed of the steering wheel, the steering speed of the steering wheel (variation of the steering angle with time) is more important than the steering angle itself. Therefore, it is required to be able to readily determine whether or not the output signal of the sensor for detecting the steering speed is correct.

SUMMARY OF THE INVENTION

It is an object of the present invention to provide a method and apparatus for determining a failure of a steering sensing device of a motor vehicle, wherein it is possible to readily determine whether at least one of a steering speed sensor for controlling the rear wheel steering speed and a steering angle sensor for correcting the steering angle of the rear wheels.

According to an aspect of the present invention, the above object is attained by a method of determining a failure of a steering sensing device of a steering shaft of a motor vehicle, comprising the steps of: detecting steering angle of the steering shaft from a neutral position by a steering angle sensor; sensing a steering speed of the steering shaft by means of a steering speed sensor; calculating a variation with time of the steering angle detected by the steering angle sensor; comparing the variation with the steering speed; and determining a failure of at least one of the steering angle sensor and the steering speed sensor when the difference or a ratio between the variation and the steering speed is outside the predetermined range.

According to another aspect of the present invention, there is provided an apparatus for determining a failure of a steering sensing device of a motor vehicle with a steering shaft, the apparatus comprising: a steering angle sensor provided adjacent to the steering shaft for detecting steering angle of the steering shaft from a neutral position; a steering speed sensor provided adjacent to the steering shaft for detecting steering speed of the steering shaft; calculation means for calculating a value of variation with time of the steering angle detected by the steering angle sensor; and comparing means responsive to outputs of said calculation means and said steering speed sensor for comparing the calculated value of the variation and the value of the detected steering speed to determine that at least one of the steering angle sensor and the steering speed sensor is in failure when the difference between the two values or the ratio of one value to the other value is outside a predetermined range.

A preferred embodiment of the present invention will become understood from the following detailed description referring to the accompanying drawings.

DETAILED DESCRIPTION OF THE PREFERRED EMBODIMENT

Figure 1:
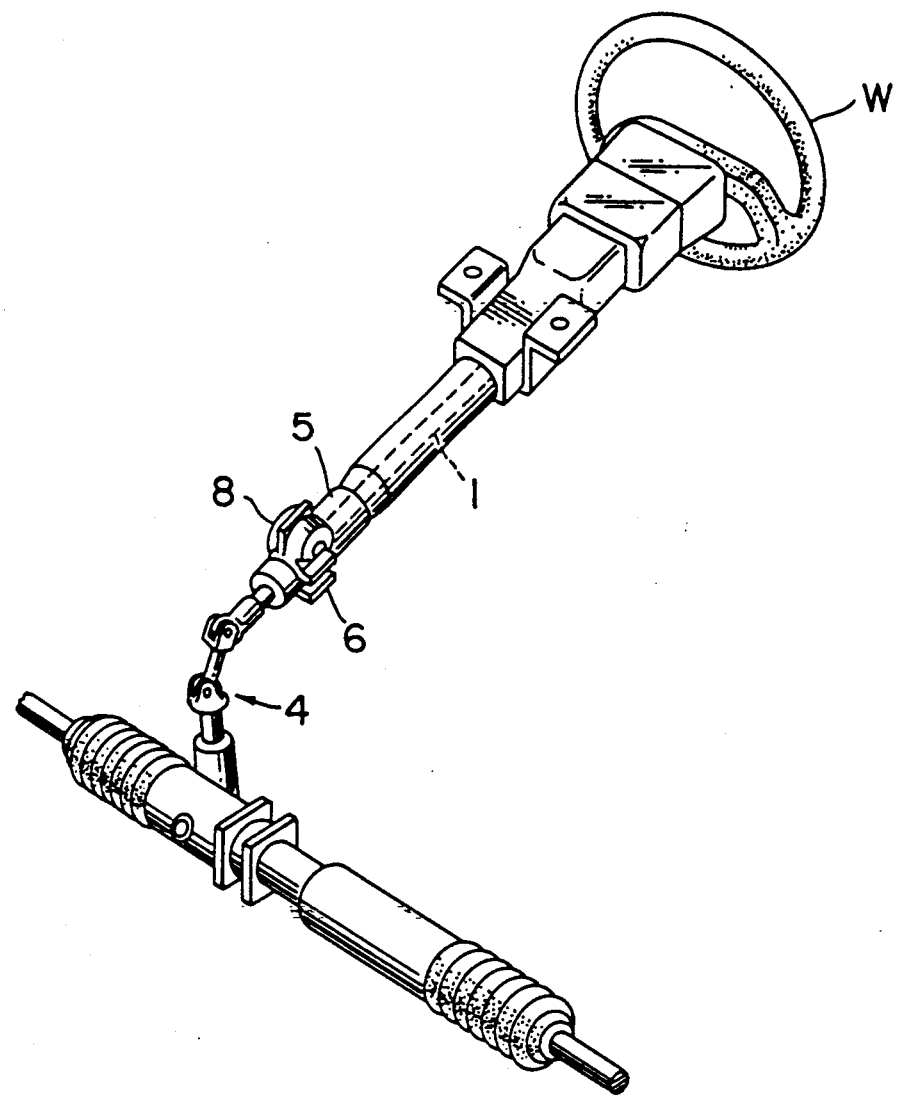
FIG. 1 is a fragmentary perspective view showing a steering mechanism.

Referring to FIG. 1, a steering wheel W has a steering shaft 1 extending through a steering column 5. The steering shaft 1 is connected to a steering linkage through a universal coupling mechanism 4.

Figure 2:
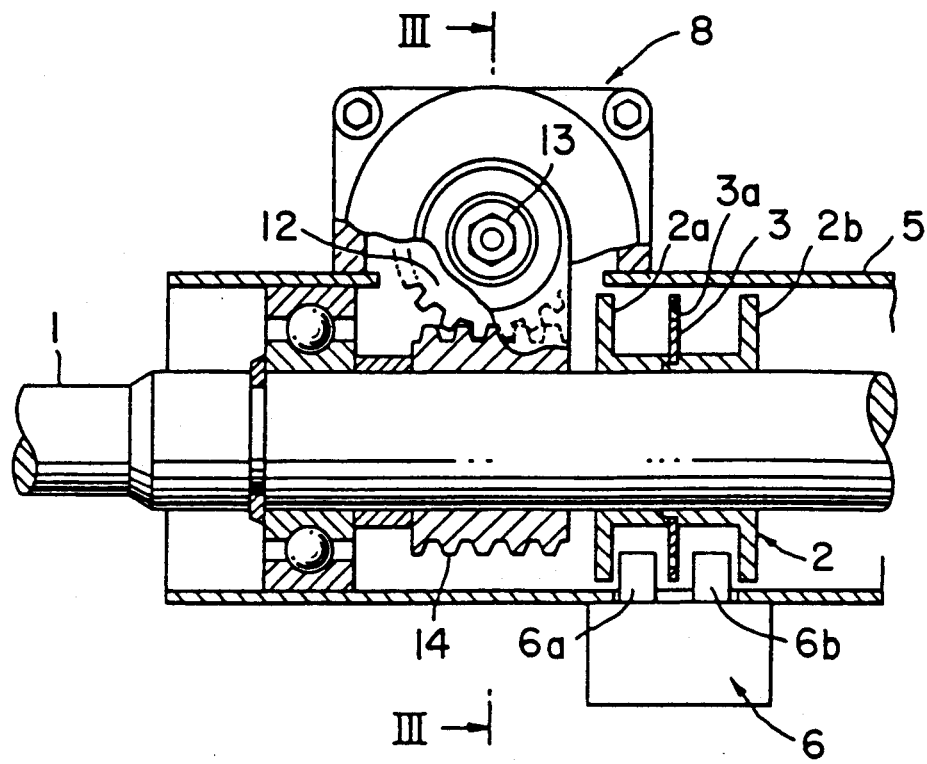
FIG. 2 is a longitudinal section, on an enlarged scale, through a steering column, showing a steering shaft, a steering speed sensor and a steering angle sensor.

As shown in FIG. 2, the steering shaft 1 has a disc casing 2 in the form of a pulley fixedly mounted on the shaft 1. The disc casing 2 is made up of two casing sections 2a and 2b between which a rotary disc 3 is fixedly secured. The disc 3 has a number of slits 3a formed therethrough along the periphery of the disc 3 in an angularly equi-distantly spaced arrangement.

Figure 3:
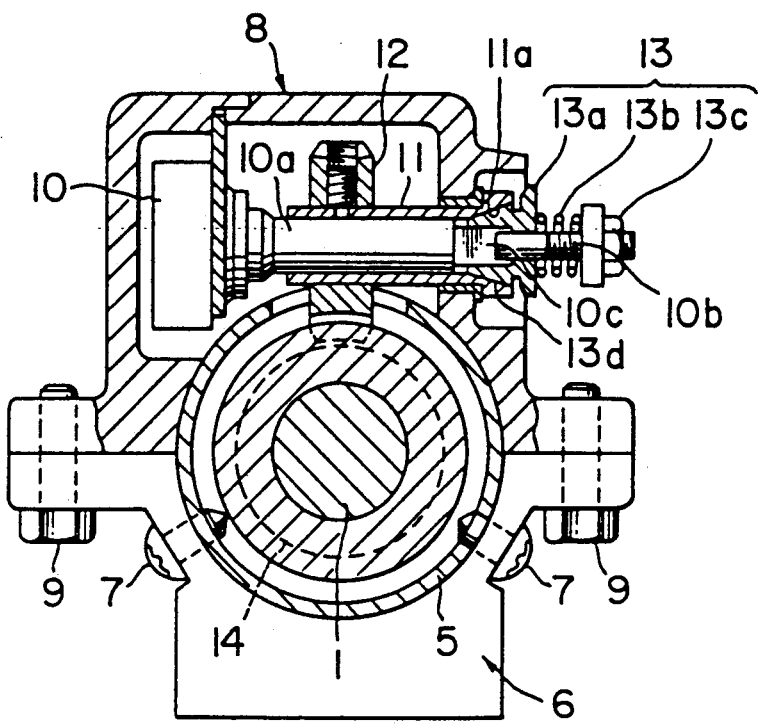
FIG. 3 is a sectional view taken along the line III—III in FIG. 2.

At both sides of the disc 3 there are provided a light emitting element 6a and a light receiving element 6b. The light emitting element 6a is typically a light emitting diode. The light receiving element 6b is typically a photodiode or a phototransistor. The peripheral part of the disc 3 where the slits 3a are formed passes between the light emitting element 6a and the light receiving element 6b. The light emitting and receiving elements 6a and 6b constitute part of a steering speed sensor 6 in the form of a rotary encoder. The casing of the steering speed sensor 6 is attached to the outer surface of the steering column 5 by means of mounting screws 7 passed through the sensor casing and the steering column 5, as shown in FIG. 3.

The rotary disc 3 and the disc casing 2 rotate together with the steering shaft 1 within the steering column 5. As the disc 3 rotates, light emitted from the light emitting element 6a is passed through the slits 3a as the slits 3a pass successively between the elements 6a and 6b. Light beam which has passed through the slits 3a is detected by the light receiving element 6b, which produces pulse or sine wave signals corresponding to the slits 3a through which the light beam has passed, as is well known in the art. The number of pulses per unit time is used to detect the steering speed, i.e., the angular rotational speed of the steering shaft 1.

The steering speed sensor 6 is a known two-phase type rotary encoder which outputs first and second pulse trains. The second pulse train has a phase delay of 90° relative to the first pulse train.

A steering angle sensor 8 is mounted on the outer surface of the steering column 5 at a diametrically opposite side of the steering speed sensor 6. As shown in FIG. 2, the steering angle sensor 8 and the steering speed sensor 6 are mounted at axially offset positions. The casing of the steering angle sensor 8 is, as shown in FIG. 3, secured to the casing of the steering speed sensor 6 by means of mounting bolts 9. Such construction for mounting the steering speed sensor 6 and the steering angle sensor 8 is advantageous for the following reason. That is, when a vehicle collision occurs at its front side, the steering column 5 tends to collapse longitudinally thereof so that the mounting screws 7 will be broken. In this case, not only the steering speed sensor 6 but also the steering angle sensor 8 will be separated from the collapsed steering column 5, so that energy of the collision is absorbed by the collapsing deformation of the column 5.

A potentiometer 10 is disposed in the casing of the steering angle sensor 8. The potentiometer 10 has a spindle 10a on which a sleeve 11 is slidably fitted. The sleeve 11 has a frusto-conical internal surface 11a at an end thereof. The sleeve 11 further has a worm wheel 12 which is fixedly mounted thereon and meshes with a worm 14 fixed to the steering shaft 1.

Adjacent to the frusto-conical end surface 11a of the sleeve 11, there is provided a clutch mechanism 13, which comprises an engaging member 13a, an adjusting nut 13c screwed on screw threads formed on an extension 10b of the spindle 10a, and a compression spring 13b interposed between the engaging member 13a and the nut 13c to resiliently urge a conical end surface 13d of the engaging member 13a against the frusto-conical internal end surface 11a of the sleeve 11. The engaging member 13a is fitted on a non-cylindrical (for example, square in cross section) portion 10c of the spindle 10a so that the engaging member 13a rotates with the spindle 10a.

Thus, when the steering shaft 1 rotates, the worm 14 is rotated to cause the worm wheel 12 and the sleeve 11 to rotate. The rotation of the sleeve 11 is transmitted to the spindle 10a of the potentiometer 10 through the engaging member 13a. When the nut 13c is loosened, the conical surface 11a of the sleeve 11 is brought into slidable contact with the conical surface 13d of the engaging member 13a to disengage the clutch mechanism 13 so that the potentiometer spindle 10a and the steering shaft 1 can be adjustingly rotated independently.

For an initial setting of the potentiometer 10, the clutch mechanism 13 is cut off in the manner stated above and then the neutral angular position of the steering shaft 1 and the electrically neutral position of the potentiometer 10 are caused to coincide with each other, the clutch mechanism 13 being thereafter coupled. Thus, when the steering wheel W and hence the steering shaft 1 are rotated in either direction for steering, the spindle 10a of the potentiometer 10 rotates. Accordingly, the rotational angle of the steering shaft 1 is detected from the output of the potentiometer 10.

As described above, there is provided a steering speed sensor 6 and the steering angle sensor 8 in the apparatus for determining a failure of the steering sensing device. According to a characteristic feature of the present invention, variation with time of the output value of the steering angle sensor 8 and the output value of the steering speed sensor 6 are compared, and it is determined that either one or both of the steering angle sensor 8 and the steering speed sensor 6 is or are in failure or disorder, when the difference between the compared values is in excess of a predetermined value or when the difference between one (1) and the ratio of the compared values is in excess of another predetermined value.

Figure 4:
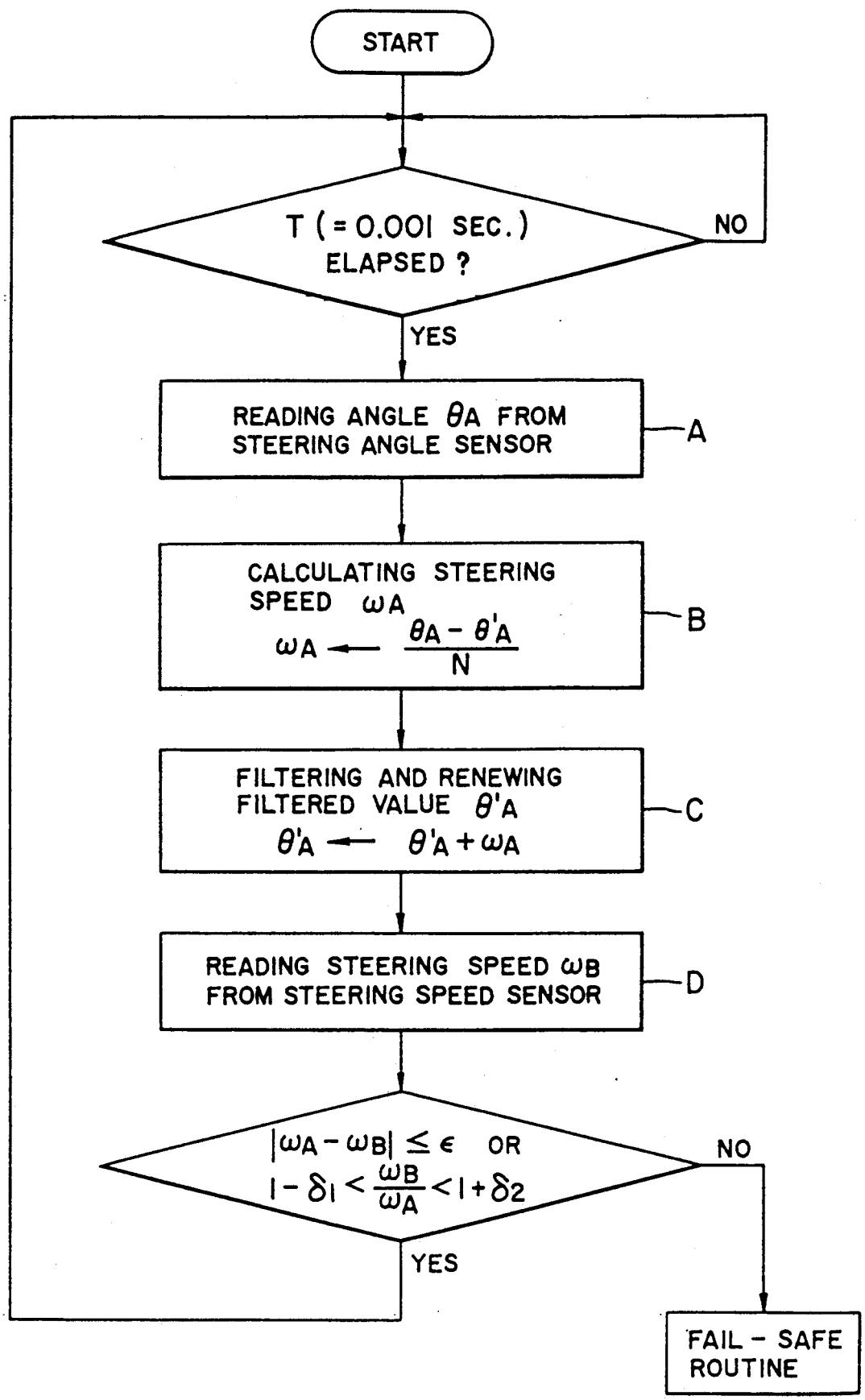
FIG. 4 is a flow chart showing procedures for determining a failure of the steering speed sensor and/or the steering angle sensor.

With reference to FIG. 4 showing a flow chart, steps of determining the failure will be described in detail below.

As shown in a step A, a present steering angle $\theta_A$ detected by the steering angle sensor 8 is read at intervals of a sampling time T [for example, 1 millisecond (=0.001 second)]. Then, as indicated in a step B, a steering speed (angular speed) $\omega_A$ is calculated on the basis of the present steering angle $\theta_A$ and a previous steering angle $\theta'_A$ which has been renewed in a step C of a previous routine of a program before one sampling time T (1 millisecond). The value $\theta'_A$ is subtracted from the steering angle $\theta_A$. The value $(\theta_A - \theta'_A)$ is divided by a proportional constant N (an integral number) for obtaining the angular steering speed $\omega_A$. Then, the present steering angle $\theta_A$ is filtered by a first order lag element with a time constant NT (N is the integral number and T is the sampling time) corresponding to a rate time used for obtaining the steering speed, and the thus filtered steering angle is used as the value $\theta'_A$. Thereafter, as shown in a step C, the filtered value $\theta'_A$ is renewed by the steering angular speed $\omega_A$ calculated in the step B.

Then, the steering angular speed $\omega_B$ detected by the steering speed sensor 6 is read in a step D. The steering angular speed $\omega_A$ obtained in the step B and the steering speed $\omega_B$ obtained in the step D are thereafter compared. When the difference between the speeds $\omega_A$ and $\omega_B$ is out of a predetermined range $(-\epsilon_1 \leq \omega_A - \omega_B \leq \epsilon_2)$, it is determined that the steering sensing device is in failure. Alternatively, when the difference between one (1) and the ratio of the speed $\omega_A$ to the speed $\omega_B$ is outside a predetermined range $(-\delta_1 \leq 1 - \omega_A/\omega_B \leq \delta_2)$, it is determined that the steering sensing device is in failure. When determined as above, a fail-safe routine such as alarming is carried out, while when not determined as above, the sampling is successively carried out.

Figure 5:
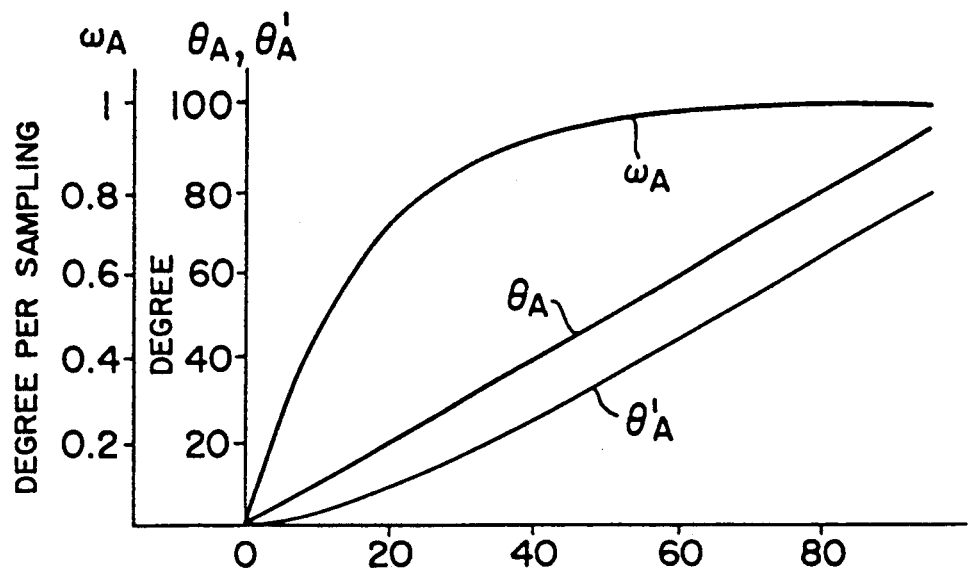
FIG. 5 is a graph for explaining some steps shown in the flow chart of FIG. 4.

The table below and FIG. 5 show calculation processes and the result in the steps A, B and C with respect to a ramp response in the case where the time constant NT corresponding to the rate time is set to 0.016 second (N=16, T=0.001 second).

| Number of Sampling (N) (Time . . . in Second) | Step | $\theta_A$ (Degree) | $\theta'_A$ (Degree) | $\omega_A$ (Degree per Sampling) |
|---|---|---|---|---|
| 0 | | 0 | 0 | 0 |

-continued

| Number of Sampling (N) (Time ... in Second) | Step | $\theta_A$ (Degree) | $\theta'_A$ (Degree) | $\omega_A$ (Degree per Sampling) |
|---|---|---|---|---|
| 1 (0.001 sec.) | A | 1 | ↑ | ↑ |
|  | B | ↑ | ↑ | 0.0625 |
|  | C | ↑ | 0.0625 | ↑ |
|  | D | ↑ | ↑ | ↑ |
|  | . | ↑ | ↑ | ↑ |
|  | . |  |  |  |
| 9 (0.002 sec.) | A | 2 | ↑ | ↑ |
|  | B | ↑ | ↑ | 0.1211 |
|  | C | ↑ | 0.1836 | ↑ |
|  | D | ↑ | ↑ | ↑ |
|  | . | ↑ | ↑ | ↑ |
|  | . |  |  |  |
| 3 (0.003 sec.) | A | 3 | ↑ | ↑ |
|  | B | ↑ | ↑ | 0.1760 |
|  | C | ↑ | 0.360 | ↑ |
|  | D | ↑ | ↑ | ↑ |
|  | . | ↑ | ↑ | ↑ |
|  | . |  |  |  |
|  | . | . | . | . |
|  | . | . | . | . |

In the above table, the method of calculation in the steps is as follows.

$$\frac{1-0}{16} = 0.0625$$

$$\frac{2-0.0625}{16} = 0.1211 + 0.0625 = 0.1836$$

$$\frac{3-0.1836}{16} = 0.1760 + 0.1836 = 0.360$$

Figure 6:
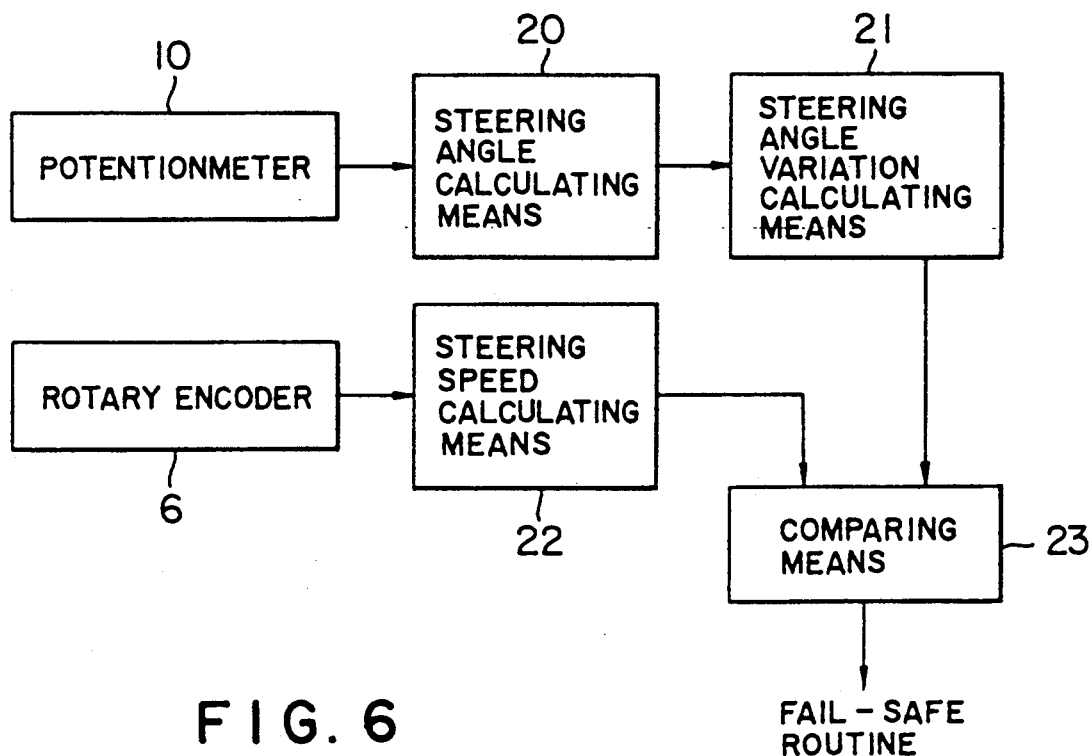
FIG. 6 is a block diagram showing an apparatus for determining a failure according to the present invention.

FIG. 6 shows a block diagram of an apparatus for determining a failure of the steering sensing device. The apparatus has a steering angle calculating means 20 responsive to the output of the potentiometer 10 for calculating the steering angle from the neutral position. The output value of the calculating means 20 is supplied to a steering angle variation calculating means 21 where variation with time of the steering angle (that is, the steering speed) is calculated.

On the other hand, the output of the rotary encoder 6 is delivered to a steering speed calculating means 22 where the steering speed is calculated. The output of the calculating means 22 is supplied to a comparing means 23, while the output of the steering angle variation calculating means 21 is supplied also to the comparing means 23.

The two output signals from the calculating means 21 and 22 are compared in the comparing means 23 to give the difference between the values of the two output signals, and when the difference is outside of a predetermined range, the comparing means 23 delivers a signal indicating that at least one of the potentiometer 10 and the rotary encoder 6 is in failure. Alternatively, the comparing means 23 delivers a signal indicating a failure when the ratio of one value to the other value is outside of a predetermined range.

As described above, the method and apparatus according to the present invention are useful in determining whether there is a failure in the functions of the steering speed sensor and/or the steering angle sensor, which are used for controlling the steering operation of the rear wheels.

Though the optical steering speed sensor is used in the embodiment of the present invention, conventional magnetic or electric steering speed sensor may be utilized. Further, a well known optical or magnetic steering angle sensor may be used instead of the potentiometer.

While the presently preferred embodiment of the present invention has been shown and described, it is to be understood that the disclosure is for the purpose of illustration and that various changes and modifications may be made without departing from the scope of the invention as set forth in the appended claims.

What is claimed is:

1. A method of determining a failure of a steering sensing device of a steering shaft mounted on a motor vehicle, comprising the steps of:
    detecting steering angle of the steering shaft from a neutral position by a steering angle sensor;
    sensing a steering speed of the steering shaft by means of a steering speed sensor;
    calculating a variation with time of the steering angle detected by the steering angle sensor;
    comparing the variation with the steering speed; and
    determining a failure of at least one of the steering angle sensor and the steering speed sensor when the difference or a ratio between the variation and the steering speed is outside a predetermined range.

2. The method according to claim 1, wherein said variation of the steering angle is calculated by:
    detecting a present steering angle at intervals of a sampling time;
    subtracting a previous steering angle detected in a previous routine of a program from the present steering angle to obtain a subtraction value; and
    dividing the subtraction value by a proportional time constant.

3. The method according to claim 2, wherein said previous steering angle is obtained by:
    filtering the value of the steering angle detected in the previous routine by a first order lag element; and
    renewing the filtered value by the steering speed calculated in the previous routine.

4. The method according to claim 1, wherein at least one of the steering angle sensor and the steering speed sensor is determined to be in failure when the difference between one (1) and said ratio is outside a predetermined range.

5. An apparatus for determining a failure of a steering sensing device of a steering shaft mounted on a motor vehicle, comprising:

a steering angle sensor provided adjacent to the steering shaft for detecting steering angle of the steering shaft from a neutral position;

a steering speed sensor provided adjacent to the steering shaft for detecting a value of steering speed of the steering shaft;

calculating means for calculating a value of variation with time of the steering angle detected by the steering angle sensor; and comparing means responsive to outputs of said calculating means and said steering speed sensor for comparing the calculated value of the variation and said value of the detected steering speed to determine that at least one of the steering angle sensor and the steering speed sensor is in failure when the difference between the two values or the ratio of one value to the other value is outside a predetermined range.

* * * * *